United States Patent
Sharma

(10) Patent No.: US 7,548,614 B2
(45) Date of Patent: Jun. 16, 2009

(54) AUDIBLE ANNOUNCEMENT PLAYED TO CALLING PARTY BEFORE ESTABLISHMENT OF TWO PARTY STABLE CALL

(75) Inventor: Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 664 days.

(21) Appl. No.: 11/066,082

(22) Filed: Feb. 25, 2005

(65) Prior Publication Data
US 2006/0193451 A1 Aug. 31, 2006

(51) Int. Cl.
*H04M 15/00* (2006.01)
(52) U.S. Cl. .................. 379/114.01; 379/70; 379/88.17
(58) Field of Classification Search .............. 379/88.03, 379/207.14, 71, 88.16, 114.01–114.03
See application file for complete search history.

(56) References Cited

U.S. PATENT DOCUMENTS

| | | | | |
|---|---|---|---|---|
| 5,012,511 A | * | 4/1991 | Hanle et al. ............. | 379/201.05 |
| 5,825,858 A | * | 10/1998 | Shaffer et al. ............... | 379/120 |
| 5,875,242 A | * | 2/1999 | Glaser et al. ........... | 379/201.05 |
| 5,898,769 A | * | 4/1999 | Furman .................. | 379/221.05 |
| 5,930,343 A | * | 7/1999 | Vasquez ................. | 379/114.01 |
| 5,970,133 A | * | 10/1999 | Salimando ............. | 379/213.01 |
| 6,084,953 A | * | 7/2000 | Bardenheuer et al. .. | 379/114.01 |
| 6,185,194 B1 | * | 2/2001 | Musk et al. .................. | 370/260 |
| 6,282,566 B1 | * | 8/2001 | Lee et al. ..................... | 709/217 |
| 6,310,948 B1 | * | 10/2001 | Nemeth .................. | 379/213.01 |
| 6,373,930 B1 | * | 4/2002 | McConnell et al. .... | 379/114.28 |
| 6,473,499 B1 | * | 10/2002 | Ng et al. ................. | 379/121.02 |
| 6,650,738 B1 | * | 11/2003 | Pershan et al. ........... | 379/88.03 |
| 6,671,359 B1 | * | 12/2003 | Enzmann et al. ....... | 379/115.01 |
| 6,879,678 B1 | * | 4/2005 | Lang .......................... | 379/219 |
| 7,010,111 B1 | * | 3/2006 | Blackburn et al. ..... | 379/207.14 |

* cited by examiner

*Primary Examiner*—Simon Sing

(57) ABSTRACT

An audible announcement is played to a calling party, upon initiation of a call to a called party, before establishment of the call as a two party stable call between the calling party and the called party. The audible announcement comprises one or more of: a number of the called party; a name of the called party; and/or a rate for the call between the calling party and the called party.

18 Claims, 2 Drawing Sheets

AUDIBLE ANNOUNCEMENT PLAYED TO CALLING PARTY BEFORE ESTABLISHMENT OF TWO PARTY STABLE CALL

TECHNICAL FIELD

The invention relates generally to communications and more particularly to announcements played to a calling party.

BACKGROUND

Known telephone networks connect calls between calling and called parties. Usually the calling party knows the identity of the called party and correctly dials the telephone number of the called party to initiate a call to the called party. However, when a calling party places a call there is a chance that the call is being initiated to an unknown location. The calling party may have dialed a wrong number or dialed a number that is unknown to the calling party.

In one example, the calling party may attempt to call a friend, but dial a wrong number. The calling party will not find out that the wrong number was dialed until the call is connected with the called party at the wrong number. As one shortcoming, wrong number calls are inconvenient for both the calling party and the called party. As another shortcoming, the calling and/or called parties may be billed for the connection time of the call to the wrong number.

In another example, the calling party may have received a message to call a number to verify the charges on a credit card. However, the calling party may not know the identity of the owner of the number. The number may be owned by an identity thief posing as the credit card company in attempt to get unsuspecting people to enter credit card information. As one shortcoming, the calling party may not discover the true identity of the owner of the dialed number and part with the credit card information.

In yet another example, the calling party may have received a message indicating that it is urgent to call a number for some reason. However, the calling party may not know the identity of the owner of the number. The number may be associated with a scam to get people to call a premium number that carries a high per minute rate. As one shortcoming, the calling party may call the number and be unaware that the call is being billed at a high per minute rate.

A called number information system provides called party information to the calling party to confirm the identity of the owner of the dialed number. A known called number information system sends called number information to the customer premise equipment of the calling party. The customer premise equipment employs a display screen to present the called number information to the user of the customer premise equipment. However, some calling parties use phones without display screens. As one shortcoming, users with phones that lack display screens are unable to receive the called party information. As another shortcoming, the display screen may be in a location that is inconvenient for the user to view during connection of the call. As yet another shortcoming, visually impaired calling parties are unable to view the called party information presented on a display screen.

Thus, a need exists for an enhanced presentation of called number information to a calling party. A further need exists for presentation of the called number information in a manner that promotes an increase in availability of the called number information to calling parties.

SUMMARY

A called number information service provides called party information to a calling party. The calling party initiates a call to the called party by dialing a telephone number of the called party. The called number information service receives the digits dialed by the calling party and employs the digits dialed for a database lookup. The called number information service acquires information from the database about the called party, such as a name of the called party. The called number information service plays an audible announcement of the name and/or number of the called party to the calling party. The called number information service may also include a rate for the call in the audible announcement. If the name, number, or rate is not what the calling party expected, the calling party has an opportunity to end the call before establishment of the call as a two party stable call between the calling party and the called party.

In one embodiment, there is provided a method for playing an audible announcement to a calling party, upon initiation of a call to a called party, before establishment of the call as a two party stable call between the calling party and the called party. The audible announcement comprises one or more of: a number of the called party; a name of the called party; and/or a rate for the call between the calling party and the called party.

In another embodiment, there is provided an apparatus comprising an intelligent peripheral and a service control point that sends a temporary local directory number of the intelligent peripheral to a switching center to direct to the intelligent peripheral a call initiated by a calling party for a called party. The intelligent peripheral plays to the calling party an audible announcement of one or more of: a number of the called party; a name of the called party; and/or a rate for the call between the calling party and the called party, before establishment of the call as a two party stable call between the calling party and the called party.

In yet another embodiment, there is provided an article comprising one or more computer-readable signal-bearing media. The article includes means in the one or more media for playing an audible announcement to a calling party, upon initiation of a call to a called party, before establishment of the call as a two party stable call between the calling party and the called party. The audible announcement comprises one or more of: a number of the called party; a name of the called party; and/or a rate for the call between the calling party and the called party.

DESCRIPTION OF THE DRAWINGS

Features of exemplary implementations of the invention will become apparent from the description, the claims, and the accompanying drawings in which:

DETAILED DESCRIPTION

Figure 1:
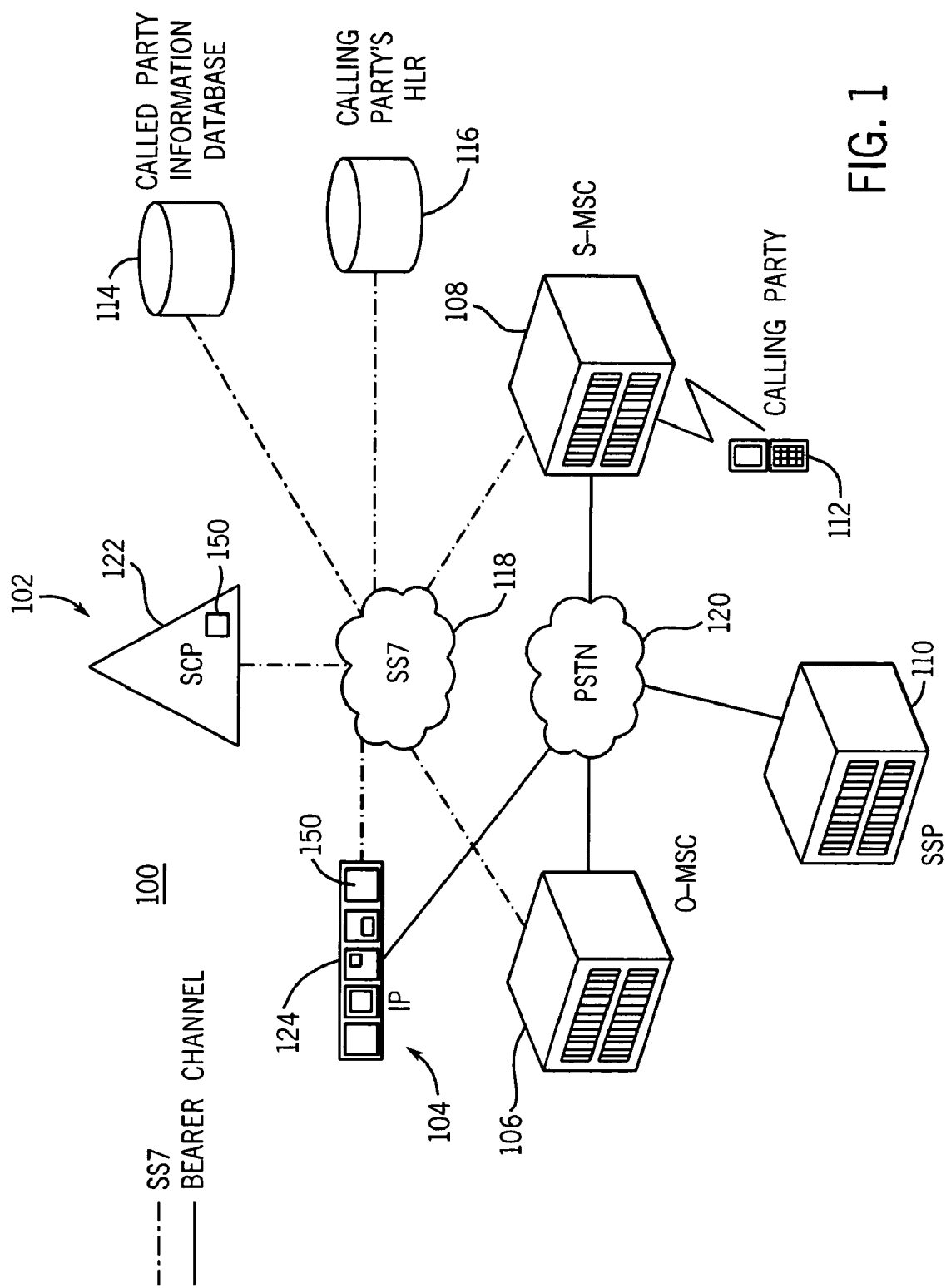
FIG. 1 is a representation of one implementation of an apparatus that comprises one or more intelligent network platforms, one or more mobile switching centers, one or more service switching points, one or more calling parties, and one or more called number information databases.

Turning to FIG. 1, an apparatus 100 provides a called number information service for wireless, wire-line, and/or voice over internet protocol ("VoIP") telecommunication systems. The called number information service plays an audible announcement of called party information to a calling party. The called party information may comprise one or more of: a number of the called party; a name of the called party; and/or a billing rate for the call between the calling party and the called party. The called number information service provides the calling party with an opportunity to end the call before establishment of the call as a two party stable call between the calling party and the called party. Therefore, the called number information service can serve to reduce the number of wrong number call connections and the chance that billing charges are incurred for dialing a wrong number. The called number information service can also serve to prevent connections to fraudulent numbers, such as unexpected premium numbers or numbers associated with a scheme to fraudulently acquire personal information.

The apparatus 100 in one embodiment comprises one or more intelligent network ("IN") platforms 102 and 104, one or more mobile switching centers ("MSCs") 106 and 108, one or more service switching points ("SSPs") 110, one or more calling parties 112, and one or more called party information databases 114. In one example, the apparatus 100 further comprises a home location register ("HLR") 116 associated with the calling party 112. The calling party 112 in one example comprise a calling communication device and a user of the calling communication device.

A signaling network 118 communicatively couples the intelligent network platforms 102 and 104, the MSCs 106 and 108, the called party information database 114, and the home location register 116. The signaling network 118 in one example comprises a signaling system 7 ("SS7") network that supports signaling traffic. A bearer network 120 communicatively couples the intelligent network platform 104, the MSCs 106 and 108, and the SSP 110. The bearer network 120 in one example comprises a public switched telephone network ("PSTN") that supports bearer traffic.

The intelligent network platforms 102 and 104 comprise telephony network platforms. The intelligent network platforms 102 and 104 support intelligent network technology and standards. In one example, the intelligent network platforms 102 and 104 comprise wireless intelligent network ("WIN") platforms. In another example, the intelligent network platforms 102 and 104 comprise Customized Applications for Mobile network Enhanced Logic ("CAMEL") platforms. Exemplary embodiments of the intelligent network platforms 102 and 104 comprise one or more of a service control point ("SCP") 122 and an intelligent peripheral ("IP") 124. The intelligent network platforms 102 and 104 comprise an instance of a recordable data storage medium 150, as described herein.

The intelligent network platforms 102 and 104 may be combined into a single intelligent network platform or divided into a plurality of intelligent network platforms. For example, the functionality of the SCP 122 and the IP 124 may be combined into a single service node. The intelligent network platforms 102 and 104 serve to route calls, lookup called number information from the called party information database 114, and play audible announcements of the called number information to the calling party 112. For example, the intelligent network platforms 102 and 104 serve to enable a called number information service that plays the audible announcement to the calling party 112 before establishment of a two party stable call between the calling party 112 and a called party.

In one example, the SCP 122 comprises service logic, American National Standards Institute ("ANSI-41") message handling logic, WIN message handling logic, and an SS7 interface. In another example, the SCP 122 comprises service logic, Global System for Mobile communications ("GSM") message handling logic, and Customized Applications for Mobile network Enhanced Logic message handling logic, and the SS7 interface. The SCP 122 in one example employs one or more of WIN, CAMEL, ANSI Capability Set 1 ("CS-1"), International Telecommunication Union ("ITU-T") CS-1, and session initiation protocol ("SIP") signaling to route calls that require the called number information service to the IP 124. SIP signaling employs additional network components, such as a media gateway. An exemplary employment of ANSI signaling is illustrated herein.

The SCP 122 in one example provides instruction to the IP 124 to control the functionality of the IP 124. In one example, the SCP 122 sends a message to the IP 124 to instruct the IP 124 to play the audible announcement of the called party information to the calling party 112. In another example, the SCP sends a message to the IP 124 to instruct the IP 124 to acquire the called party information from the called party information database 114, and then play the audible announcement of the called party information to the calling party 112.

The MSCs 106 and 108 support mobile telecommunication devices, for example, the calling party 112. The MSCs 106 and 108 in one example comprise an originating mobile switching center ("O-MSC") 106 and a serving mobile switching center ("S-MSC") 108. For example, the O-MSC 106 supports a home area of the calling party 112 and the S-MSC 108 supports the calling party 112 if the calling party 112 moves to the roaming area covered by the S-MSC 108. If the calling party 112 is within the home area supported by the O-MSC 106, then the S-MSC 108 may not be in the call path between the calling party 112 and the called party. For example, the O-MSC 106 would also serve as a S-MSC for the calling party 112.

The MSCs 106 and 108 trigger the called number information service for wireless calling parties in the respective service areas of the MSCs 106 and 108. For example, when the calling party 112 is within the service area of the O-MSC 106, the O-MSC 106 triggers the called number information service for the calling party 112. When the calling party 112 is within the service area of the S-MSC 108, the S-MSC 108 triggers the called number information service for the calling party 112. The MSCs 106 and 108 activate an All_Calls origination trigger for calls from called number information service subscribers. Upon receipt of a call from a subscriber, the responsible one of the MSCs 106 and 108 sets up a call leg with the IP 124 so the IP 124 can play the audible announcement of called party information to the calling party 112.

The SSP 110 supports wire-line telecommunication devices. The SSP 110 triggers the called number information service for wire-line calling parties. For example, the SSP 110 activates the All_Calls origination trigger for calls from wire-line called number information service subscribers. Upon receipt of a call from a subscriber, the SSP 110 sets up a call leg with the IP 124 so the IP 124 can play the audible announcement of called party information to the calling party 112.

The database 114 stores information on the owners of telecommunication devices. For example, the database 114 may store the name and/or number of the party called by the calling party 112. The database 114 in one example stores the name and/or the number of the called party and names and/or numbers of a plurality of additional called parties. The database 114 in one example stores one or more text strings that indicate the name and/or the number of the called party. The database 114 may also store billing rate information for called numbers, such as premium numbers.

The database 114 may be hosted inside or outside of the telecommunication system. In one example, the database 114 is an external public database and the SCP 122 or IP 124 employs a web service call to access the external public database. In another example, the database is hosted within the telecommunication system and synced with an external public database. For example, the database 114 may be periodically updated by syncing with the external public database.

Figure 2:
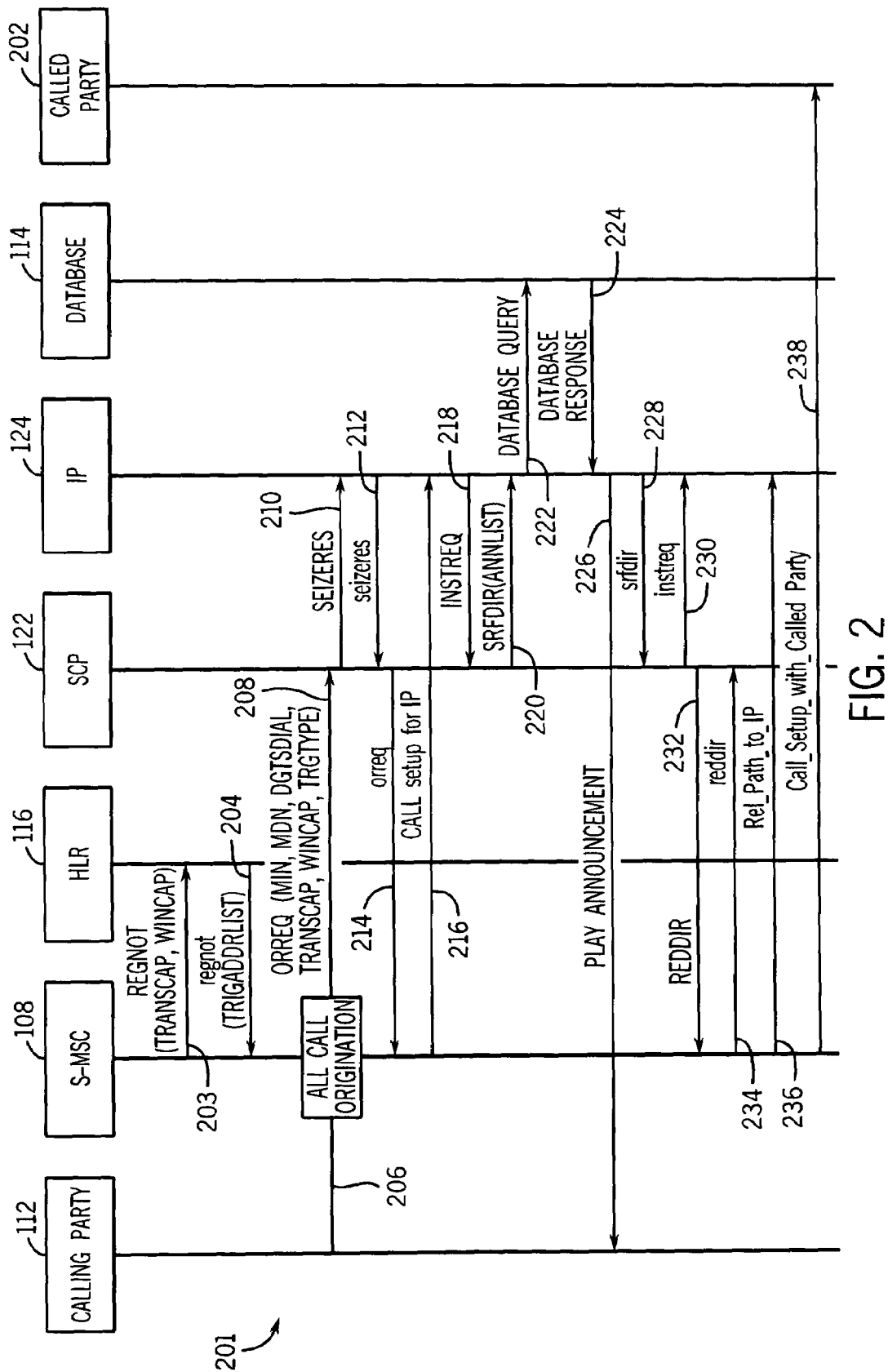
FIG. 2 is a representation of one exemplary call flow for connection of a call leg to an intelligent network platform to play an audible announcement of called party information to the calling party of the apparatus of FIG. 1.

Turning to FIG. 2, an illustrative description of one exemplary operation of the apparatus 100 is now presented, for explanatory purposes. A message flow 201 represents an exemplary connection of a call from the calling party 112 to a called party 202. The message flow 201 also represents an exemplary connection of a call leg to the IP 124 to play an audible announcement of information of the called party 202 to the calling party 112. The calling party 112 in one example subscribes to the called number information service to receive called party information. The message flow 201 illustrates one embodiment of the called number information service.

To acquire information on the calling party 112, the S-MSC 108 sends a registration notification ("REGNOT") message 203 to the HLR 116. The HLR 116 stores information about the service subscriptions of the calling party 112. Upon receipt of the registration notification message 203, the HLR 116 accesses the information on the calling party 112 and sends a registration notification return ("regnot") message 204 back to the S-MSC 108. The registration notification return message 204 comprises a trigger address list ("TRIGADDRLIST") that indicates which triggers the S-MSC 108 should arm for the calling party 112. The trigger address list comprises an All_Calls origination trigger to initiate the called number information service. The All_Calls origination trigger will activate for any calls made by the calling party 112.

To initiate a call to the called party 202, the calling party 112 dials the telephone number of the called party 202 resulting in a call setup message 206 being received at the O-MSC 106. Per ANSI-41 operation, the call processing logic in S-MSC 108 encounters the All_Calls trigger when processing the call from the calling party 112. Upon encountering the All_Calls trigger, the S-MSC 108 sends an origination request ("ORREQ") message 208 to the SCP 122.

The origination request message 208 initiates a call leg setup between the S-MSC 108 and the IP 124. The origination request message 208 comprises a digits dialed ("DGTSDIAL") parameter that indicates the number dialed by the calling party 112 to initiate the call. The origination request message 208 also comprises a trigger type ("TRGTYPE") parameter that indicates which trigger was encountered. For example, the trigger type parameter in the origination request message 208 indicates that the All_Calls trigger has been encountered.

Upon receipt of the origination request message 208, the SCP 122 sends a seize resource ("SEIZERES") message 210 to the IP 124. The seize resource message 210 requests a resource of the IP 124 that is capable of accessing a database and playing an audible announcement to the calling party 112. The seize resource message 210 comprises a parameter that indicates the preferred language. Upon receipt of the seize resource message 210, the IP 124 allocates a temporary local directory number ("TLDN") for the transaction. The IP 124 sends a seize resource response ("seizeres") message 212 to indicate that the IP 124 is available to provide the called number information service for the calling party 112. The seize resource response message 212 comprises the TLDN of the IP 124 for the transaction.

Upon receipt of the seize resource response message 212, the SCP 122 sends an origination request response ("orreq") message 214 to the S-MSC 108. The origination request response message 214 carries the TLDN of the IP 124 to the S-MSC 108. The origination request response message 214 instructs the S-MSC 108 to establish a call leg to the IP 124. Upon receipt of the origination request response message 214, the S-MSC 108 initiates a call leg setup 216 to the IP 124.

After the call leg setup 216, the IP 124 sends an instruction request ("INSTREQ") message 218 to the SCP 122. The instruction request message 218 indicates to the SCP 122 that the IP 124 is ready and awaiting instruction on what action to take. Upon receipt of the instruction request message 218, the SCP 122 sends a specialized resource function directive ("SRFDIR") message 220 to the IP 124. The specialized resource function directive message 220 provides instruction to the IP 124. The specialized resource function directive message 220 comprises an announcement list ("ANNLIST") parameter.

In one embodiment, the IP 124 is responsible for acquiring the called party information from the database 114. The announcement list parameter of the specialized resource function directive message 220 carries the digits dialed by the calling party 112 to instruct the IP 124 to acquire the called party information from the database 124. Upon receipt of the specialized resource function directive message 220, the IP 124 sends a database query message 222 to the database 114. The IP 124 accesses the database 114 with the digits dialed by the calling party 112 to acquire information of the called party 202. The database 114 sends the information of the called party 202 to the IP 124 in a database response message 224. The called party information comprises one or more text strings that indicate one or more of: the name of the called party 202; the number of the called party 202; and/or the billing rate for the call. If the information of the called party 202 is unavailable or unlisted, the database 114 sends an information unavailable indication to the IP 124 in the database response message 224.

In another embodiment, the SCP 122 is responsible for acquiring the called party information from the database 114. The SCP 122 accesses the database 114 with the digits dialed by the calling party 112 to acquire the one or more text strings that indicate one or more of: the name of the called party 202, the number of the called party 202, and/or the billing rate for the call. The SCP 122 sends the one or more text strings to the IP 124 in the announcement list parameter of the specialized resource function directive message 220.

The IP 124 receives the one or more text strings either directly from the database 114 or from the SCP 122 via the specialized resource function directive message 220. Upon receipt of the one or more text strings, the IP 124 converts the one or more text strings into an audible announcement 226. For example, the IP 124 uses a speech synthesis media resource function to convert the text strings into the audible announcement 226. The IP 124 plays the audible announcement 226 to the calling party 112 before establishment of the call as a two party stable call between the calling party 112 and the called party. The audible announcement 226 may include one or more of: the name of the called party 202; the number of the called party 202; and/or a billing rate for the call. The IP 124 may include the billing rate in the audible announcement 226 if the call is a premium number and the billing rate is available. The IP 124 may also include additional available called party information in the audible announcement 226. If the information of the called party 202 is unavailable or unlisted, the IP 124 may include an indication in the audible announcement 226 that the information is unavailable.

After hearing the audible announcement 226, the calling party 112 in one example is provided with an opportunity to continue or cancel the call. The calling party 112 may receive a message requesting confirmation before establishment of the call as the two party stable call between the calling party 112 and the called party 202. For example, the IP may prompt the calling party 112 to press a Dual Tone Multi Frequency ("DTMF") button in order to continue with the call establishment. In another example, the calling party 112 may hang up if the audible announcement 226 includes unexpected called party information. For example, the calling party 112 may hang up before establishment of the call as the two party stable call between the calling party 112 and the called party 202. The IP 124 may provision a delay between the audible announcement 226 and the continuation of the call to allow the calling party 112 extra time to react to the called party information in the audible announcement 226.

After playing the audible announcement 226 to the calling party 112, the IP 124 sends a specialized resource function directive response ("srfdir") message 228 to the SCP 122. The specialized resource function directive response message 228 indicates completion of the transaction initiated by the specialized resource function directive message 220. Upon receipt of the specialized resource function directive response message 228, the SCP 122 sends a instruction request response ("instreq") message 230 to the IP 124. The instruction request response message 230 terminates the conversation with the IP 124.

After completion of the transaction with the IP 124, the SCP 122 sends a redirection directive ("REDDIR") message 232 to the S-MSC 108. The redirection directive message 232 instructs the S-MSC 108 to continue the call to the called party 202. The redirection directive message 232 carries the directory number of the called party 202 to the S-MSC 108. Upon receipt of the redirection directive message 232, the S-MSC 108 sends redirection directive response ("reddir") message 234 to the SCP 122. The redirection directive response message 234 confirms the redirection request and terminates the conversation with the SCP 122. After termination of the conversation with the SCP 122, the S-MSC 108 sends a release message 236 to the IP 124 to release the call leg with the IP 124. The S-MSC 108 also initiates call setup 238 with the called party 202 to connect the call between the calling party 112 and the called party 202.

FIG. 2 illustrates an exemplary implementation of the called number information service as a standalone service. However, the called number information service may be executed in tandem with another service, as will be appreciated by those skilled in the art. For example, the called number information service may work in combination with a pre-paid service, a virtual private network service, or a ringback tone service. To combine the called number information service with an additional service, the message flow 201 is combined with the message flow of the additional service, as will be appreciated by those skilled in the art. In one example, if the called number information service is combined with a pre-paid service, the network may check for a sufficient calling party balance before invoking the called number information service for the call. In another example, if the called number information service is combined with a ringback tone service that plays a ringback tone in place of the traditional ringing sound, the audible announcement of called party information may serve to assure the calling party 112 that the call is being connected to the correct number.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 150 of the of the intelligent network platforms 102 and 104. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A method, comprising the step of:
    arming an origination trigger on a mobile switching center for a calling party, wherein the calling party is a subscriber to a called number information service;
    receiving a call setup message that indicates digits dialed by the calling party to place a call to a called party;
    triggering the origination trigger to send an origination request to a service control point, wherein the origination reciuest comprises the digits dialed;
    accessing a database with the digits dialed by the calling party through employment of a web service call to acquire a billing rate for the call, wherein the database comprisies a public, externally hosted called party information database;

playing, by the intelligent peripheral, an audible announcement to the calling party,
before establishment of the call as a two party stable call between the calling party and the called party, wherein the audible announcement comprises the billing rate for the call.

2. The method of claim 1, wherein the step of accessing the database comprises the step of:
accessing the database to acquire a name of the called party;
wherein the step of playing the audible announcement to the calling party comprises the step of:
including the name of the called party in the audible announcement to the calling party.

3. The method of claim 1, wherein the step of accessing the database comprises the step of:
accessing the database to acquire a number of the called party;
wherein the step of playing the audible announcement to the calling party comprises the step of:
including the number of the called party in the audible announcement to the calling party.

4. The method of claim 1, wherein the step of accessing the database comprisies the step of:
acquiring from the database one or more text strings that indicate the billing rate for the call;
the method further comprising the step of:
converting the one or more text strings into the audible announcement to play to the calling party.

5. The method of claim 1, further comprising the steps of:
determining that the calling party subscribes to the called number information service;
allocating a temporary local directory number by the intelligent peripheral for use on the call; and
sending the temporary local directory number to the mobile switching center that employs the temporary local directory number to set up a call leg to the temporary local directory number for the audible announcement.

6. The method of claim 5, further comprising the step of:
instructing, after the audible announcement has played to the calling party, the mobile switching center to release the call leg with the temporary local directory number and to connect the call to the called party.

7. The method of claim 1, wherein the step of arming the origination trigger comprises the steps of:
arming the origination trigger on the mobile switching center for all calls from the calling party.

8. The method of claim 1, further comprising the step of:
providing the calling party with an opportunity to respond whether to continue or cancel the call after hearing the audible announcement and before establishment of the call as the two party stable call between the calling party and the called party.

9. The method of claim 1, wherein the digits dialed comprise a premium rate number.

10. An apparatus, comprising:
an intelligent peripheral; and
a service control point that sends a temporary local directory number of the intelligent peripheral to a mobile switching center to direct to the intelligent peripheral a call initiated by a calling party for a called party;
wherein the intelligent peripheral plays to the calling party an audible announcement of
a billing rate for the call between the calling party and the called party,
before establishment of the call as a two party stable call between the calling party and the called party;
wherein the intelligent peripheral accesses a database with a number of the called party through employment of a web service call to acquire the billing rate for the call;
wherein the database comprises a public, externally hosted called party information database.

11. The apparatus of claim 10, wherein the service control point sends an indication of digits dialed by the calling party to the intelligent peripheral;
wherein the intelligent peripheral accesses the database with the digits dialed by the calling party to acquire one or more text strings that indicate the billing rate for the call;
wherein the intelligent peripheral converts the one or more text strings into the audible announcement to play to the calling party.

12. The apparatus of claim 11, wherein the service point sends a specialized resource function directive message to the intelligent peripheral, wherein the specialized resource function directive message comprises an announcement list parameter that carries the digits dialed by the calling party.

13. The apparatus of claim 10, wherein the service control point receives an indication of digits dialed by the calling party;
wherein the service point accesses the database with the digits dialed by the calling party to acquire the billing rate for the call;
wherein the service control point sends to the intelligent peripheral one or more text strings that indicate the billing rate for the call;
wherein the intelligent peripheral converts the one or more text strings into the audible annoucement to play the calling party.

14. The apparatus of claim 13, wherein the service control point sends a specialized resource function directive message to the intelligent peripheral, wherein the specialized resource function directive message comprises an announcement list parameter that carries the one or more text strings that indicate the billing rate for the call.

15. The apparatus of claim 10 in combination with the switching center, wherein the calling party comprises a wireless phone;
wherein the mobile switching center comprises a mobile switching center in a wireless network;
wherein the mobile switching center triggers the call to the service control point to initiate a called number information service for the wireless phone.

16. The apparatus of claim 10 in combination with the mobile switching center, wherein the calling party comprises a wire-line phone;
wherein the mobile switching center comprises a service switching point in a wire-line network;
wherein the service switching point triggers the call to the service control point to initiate a called number information service for the wire-line phone.

17. The apparatus of claim 10, wherein the number of the called party comprises a premium rate number.

18. An article, comprising:
one or more computer-readable signal-bearing media;
means in the one or more media for arming an origination trigger on a mobile switching center for a calling party, wherein the calling party is a subscriber to a called number information service;
means in one or more media for receiving a call stepup message that indicates digits dialed by the calling party to place a call to a called party;

means in the one or more media for triggering the origination trigger to send an origination request to a service control point, wherein the origination request comprises the digits dialed;

means in one or more media for accessing a database with the digits dialed by the calling party through employment of a web service call to acquire a billing rate for the call, wherein the database comprises a public, externally hosted called party information database;

means in the one or more media for playing, by the intelligent peripheral, an audible annoucement to the calling party, before establishment of the call as a two party stable call between the calling party and the called party, wherein the audible announcement comprises the billing rate for the call.

* * * * *